March 27, 1934.   J. H. MATTHEWS   1,952,934
BELT
Filed Jan. 8, 1932
Fig. 1.
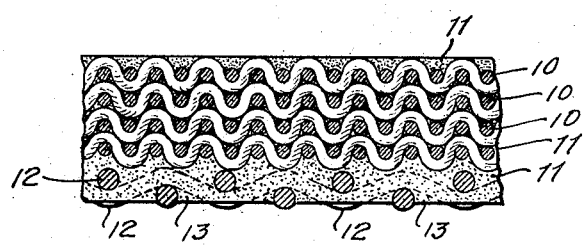
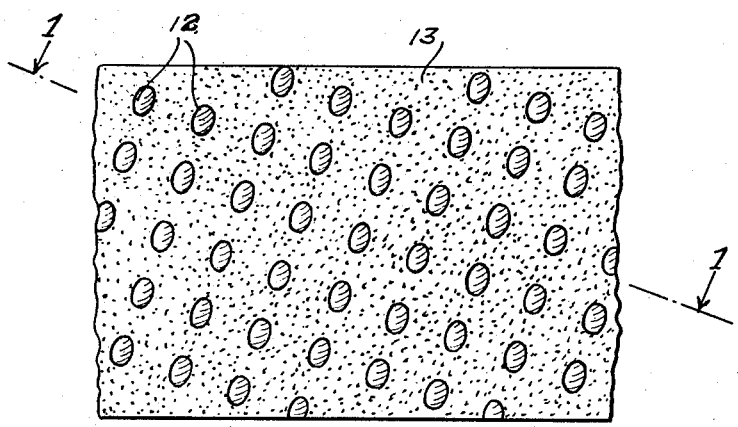
Fig. 2.
INVENTOR
J. H. MATTHEWS.
BY HIS ATTORNEYS Patented Mar. 27, 1934

1,952,934

UNITED STATES PATENT OFFICE 1,952,934

BELT

John H. Matthews, Nutley, N. J., assignor to Raybestos-Manhattan, Inc., Passaic, N. J., a corporation of New Jersey Application January 8, 1932, Serial No. 585,443

2 Claims. (Cl. 74—63)

This invention relates to a laminated fabric and the method of making the same. More particularly the invention relates to a transmission belting and friction surface which is composed largely of small thin rubber blocks separated from one another and anchored to the layers beneath by means of an open mesh fabric.

Prior to my invention, it has been recognized that rubber affords a better friction grip for a transmission belting to engage a pulley, and prior to my invention repeated efforts have been made to utilize a rubber surface upon transmission belting. These efforts have failed, however, and rubber coated belts have not proved practical because of the tendency of the rubber coating to strip from the stress-resisting portion of the belt. Often long shreds of rubber are stripped from the belt and become rolled up by the action of the pulley, so as to form lumps between the pulley and the belt which produce a concentrated and excessive stress, and result in rapid deterioration of the stress-resisting body portion of the belt. Thus, instead of improving the belts, the rubber covering has actually proven in some cases a detriment.

I have now discovered that it is possible to prevent this stripping away, and to produce a satisfactory friction surface composed very largely of rubber, which therefore presents a higher coefficient of friction, and secures a better grip upon the pulleys when used for power transmission.

In the preferred form of my invention, the surface rubber layer is anchored to the underlying layers of the belt and divided into small blocks by means of an open mesh fabric. Although the threads of such fabric decrease, by their own area, the proportion of rubber in the wear and friction surface of the belt, nevertheless, I have found that the use of such an open mesh fabric is particularly desirable because it breaks up the rubber surface layer into small thin blocks of rubber, and thereby entirely prevents the stripping action which has caused the failure of all rubber covered belts which have been known heretofore. As is well known, the separation of a rubber coating is difficult to start, but once the separation is started, it is continued with comparative ease because of the mechanical advantage produced by the bending back of the portion which has already been separated. When constructed according to the present invention, however, each small area of rubber is separated from adjacent areas by the open mesh fabric, and thereby such stripping action must be terminated within such small area, and cannot be continued for any substantial distance. Thus, if the adhesion between the rubber and the open mesh fabric or the underlying fabric is defective in any point, it will result only in the separation of the small block of rubber within the mesh at that point, whereas the surrounding rubber will remain undisturbed.

The embodiment of my invention which I now find preferable is that in which an open mesh fabric is used, and accordingly in the drawing and in the following specific description I have shown and described the use of an open mesh fabric.

In the accompanying drawing,

Fig. 1 shows in section a laminated fabric made according to the present invention; and Fig. 2 shows the friction surface of the same fabric.

Referring to Fig. 1, a plurality of layers 10 of a strong stress-resisting fabric, such as canvas, duck, etc., are plied up and vulcanized together by means of surface films of rubber between them, an open mesh fabric 12 which, as shown in Figs. 1 and 2, may advantageously be a fabric commonly known as cider cloth, is laid over the outer layer of duck 10, and has its interstices substantially filled with rubber 13, which, together with projecting portions of the open mesh fabric 12, forms the wear and friction surface of the belt. In the manufacture of this belt, layers of canvas 10 are coated or impregnated with rubber and are plied up to the desired thickness. Over this is preferably placed a thin sheet of raw rubber and on top is placed the layer of open mesh fabric 12. The assembled fabric is then placed in a vulcanizing press, such as any common belting press, and is vulcanized under heat and pressure. During this vulcanization treatment, the heat causes the rubber to soften and the pressure causes it to flow into and through the various layers of fabric, and particularly into the interstices of the open mesh fabric, so that the latter becomes entirely embedded in the rubber, and the rubber rises to the surface of the open mesh fabric. As a consequence, the finished belt will be as shown in Fig. 2, with the open mesh fabric substantially at the surface of the belt and its meshes completely filled with rubber. Thus the rubber at the surface is divided into small thin blocks, each substantially separated from its neighbor by the threads of the open mesh fabric.

Even if a substantial layer of rubber underlies the cider cloth between it and the adjacent layer of duck, nevertheless, any stripping action of the rubber will be avoided beyond the area of each small block, and the rubber covering may therefore be held satisfactorily upon the surface of the belt. It is better, however, to have only a sufficient thickness of rubber to fill the interstices of the open mesh fabric while the latter is substantially pressed against the underlying layer of fabric, since in this case, the open mesh fabric will serve not only to divide the surface covering of rubber into small blocks, and thereby to prevent the stripping action.

The surface friction layer may be made from a variety of compositions. For power belting, however, this surface layer may advantageously be an abrasion-resisting high tensile strength rubber composition similar, for example, to tread stock used in automobile tires. Although I have in the above referred throughout particularly to rubber, other materials than rubber may be used to produce the friction surface. Thus, other soft, flexible plastic materials may be used, such, for example, as the material known in the art as thiokol, which is a black, leathery, thermoplastic material, a by-product of the petroleum industry, and which may be vulcanized or stablized by heating with zinc oxide, as is well known in the art; or preferably a composition of thiokol and rubber may to advantage be adopted. These latter materials are of particular advantage in connection with belting, because more resistant to the deteriorating effects of oils, than are ordinary rubber compounds.

Although I have shown in the drawing and described above a preferred form of my invention, it is to be understood that this is for the purpose of illustration only, and is not intended as an exhaustive exposition of the various forms in which my invention may be embodied. On the contrary, I am aware that many changes and modifications may be made within the scope of my invention. For example, other fabrics than canvas duck can be used as the stress-resisting portion of the belt, and other open mesh fabrics can be used instead of the cider cloth as shown. For example, a burlap, or other loosely woven fabric could be used, or the open mesh fabric need not even be a woven fabric, but can, for example, be a perforated or other suitable open mesh material. These and many other changes may be made within the scope of my invention.

What I claim is:

1. A transmission belt comprising a plurality of layers of substantially closed mesh canvas fabric adapted to transmit the power load and a surface layer comprising an open mesh fabric and a matrix of rubber which fills the meshes of said open mesh fabric and cements said open mesh fabric layer to the canvas layers, said rubber extending substantially to the surface of said open mesh fabric layer, but not substantially therebeyond.

2. A transmission belt comprising a body layer of substantially closed mesh stress transmitting material and a surface layer comprised of cider cloth and rubber, the rubber of said surface layer substantially filling the interstices of the cider cloth but leaving the outermost portions of the cloth exposed and cementing the latter to the underlying body layer.

JOHN H. MATTHEWS.